(12) United States Patent
Nguyen et al.

(10) Patent No.: US 11,366,703 B2
(45) Date of Patent: Jun. 21, 2022

(54) DYNAMIC APPLICATION MANAGEMENT ACROSS MULTI-CLOUD COMPUTING ENVIRONMENT

(71) Applicant: EMC IP Holding Company LLC, Hopkinton, MA (US)

(72) Inventors: Thinh Lam Truong Nguyen, Medford, MA (US); Victor Fong, Medford, MA (US); Xuebin He, Westwood, MA (US); Kenneth Durazzo, San Jose, CA (US); Orlando X. Nieves, Lowell, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 142 days.

(21) Appl. No.: 16/778,611

(22) Filed: Jan. 31, 2020

(65) Prior Publication Data
US 2021/0240542 A1 Aug. 5, 2021

(51) Int. Cl.
*G06F 9/46* (2006.01)
*G06F 9/50* (2006.01)
*G06F 9/48* (2006.01)
*G06F 9/455* (2018.01)

(52) U.S. Cl.
CPC ........ *G06F 9/5083* (2013.01); *G06F 9/45558* (2013.01); *G06F 9/4843* (2013.01); *G06F 2009/45595* (2013.01)

(58) Field of Classification Search
CPC ............................. G06F 9/5083; G06F 9/4558
See application file for complete search history.

(56) References Cited

U.S. PATENT DOCUMENTS

| | | | | |
|---|---|---|---|---|
| 10,555,145 | B1* | 2/2020 | Siddiqui | H04L 41/0893 |
| 2001/0047365 | A1* | 11/2001 | Yonaitis | G06F 16/986 |
| 2004/0078538 | A1* | 4/2004 | Dutt | G06F 8/451 |
| | | | | 711/168 |
| 2014/0208197 | A1* | 7/2014 | Ellis | H04B 1/3833 |
| | | | | 715/234 |

OTHER PUBLICATIONS

Wikipedia, "Platform as a Service," https://en.wikipedia.org/wiki/Platform_as_a_service, Nov. 20, 2019, 6 pages.
Wikipedia, "Function as a Service," https://en.wikipedia.org/wiki/Function_as_a_service, December 5, 2019, 2 pages.
(Continued)

*Primary Examiner* — Camquy Truong
(74) *Attorney, Agent, or Firm* — Ryan, Mason & Lewis, LLP (57) ABSTRACT

Techniques for dynamic application management are provided. For example, an apparatus comprises at least one processing platform configured to: execute a portion of an application program in a first virtual computing element, wherein the application program comprises at least one portion of marked code; receive a request for execution of the portion of marked code; determine, based at least in part on the portion of marked code, one or more cloud platforms on which to execute the portion of marked code; and cause the portion of marked code identified in the request to be executed on the one or more cloud platforms.

20 Claims, 6 Drawing Sheets

(56) References Cited

OTHER PUBLICATIONS

Wikipedia, "OS-Level Virtualization," https://en.wikipedia.org/wiki/OS-level_virtualization, Dec. 11, 2019, 5 pages.
Wikipedia, "AspectJ," https://en.wikipedia.org/wiki/AspectJ, Dec. 18, 2019, 4 pages.
Wikipedia, "Kubernetes," https://en.wikipedia.org/wiki/Kubernetes, Dec. 28, 2019, 12 pages.
Wikipedia, "Node.js," https://en.wikipedia.org/wiki/Node.js, Dec. 29, 2019, 11 pages.
Google Cloud, "Knative," https://cloud.google.com/knative/, 2019, 8 pages.
U.S. Appl. No. 16/668,676 filed in the name of Xuebin He et al. filed Oct. 30, 2019 and entitled "Dynamic Application Decomposition for Execution in a Computing Environment."
U.S. Appl. No. 16/735,195 filed in the name of Victor Fong et al. filed Jan. 6, 2020, and entitled "Function Execution Environment Selection for Decomposed Application."

* cited by examiner

```
//go : generate spawn write-large-temp-file knative : aws
func WriteLargeTempFile (data string) string {
    ...
}
```

```
sampleproject/
    pkg1/
        spawnpkg1/
            yamls/
            Dockerfile
            code-wrappers/
                spawn_<func1_name>_code_wrapper.go
                spawn_<func2_name>_code_wrapper.go
                spawn_registry.go
            interceptors/
                spawn_<func1_name>_interceptor.go
                spawn_<func2_name>_interceptor.go
        spawnpkg1aws/
            spawn-aws.zip
            code-wrappers/
                spawn_<func1_name>_code_wrapper.go
                spawn_<func2_name>_code_wrapper.go
                spawn_registry.go
            interceptors/
                spawn_<func1_name>_interceptor.go
                spawn_<func2_name>_interceptor.go
        Makefile
        router-xyz.zip
```

DYNAMIC APPLICATION MANAGEMENT ACROSS MULTI-CLOUD COMPUTING ENVIRONMENT

FIELD

The field relates generally to information processing systems, and more particularly to techniques for dynamic application management in multi-cloud computing environments.

BACKGROUND

Enterprises are increasingly developing strategies to utilize multiple cloud service providers for hosting their software application programs (applications). For example, it is becoming more common place for enterprises to gradually move their applications to cloud platforms. In many cases, an application may be composed of multiple jobs or functions (i.e., software components) that collectively form the application. However, to move a large number of software components associated with an application to a single cloud platform requires a significant amount of manual engineering effort in terms of refactoring, testing and release management. Also, since cloud infrastructures do not have shared standards between them, attempting to move software components of a given application between multiple cloud platforms would demand the same significant amount of manual effort.

SUMMARY

Embodiments of the invention provide techniques for dynamic application management in a multi-cloud computing environment.

For example, in one embodiment, an apparatus comprises at least one processing platform comprising one or more processing devices. The at least one processing platform is configured to: execute a portion of an application program in a first virtual computing element, wherein the application program comprises at least one portion of marked code; receive a request for execution of the portion of marked code; determine, based at least in part on the portion of marked code, one or more cloud platforms on which to execute the portion of marked code; and cause the portion of marked code identified in the request to be executed on the one or more cloud platforms.

Advantageously, illustrative embodiments enable developers to decompose an application to identify software components with code-markers, and have these components running on different clouds dynamically based on user-defined policies. By defining and modifying these user-defined policies, the scheduling of the software components can be adjusted dynamically without re-deployment of the application. Furthermore, as placing and adjusting code-markers in code is relatively quick, developers can quickly test out different decomposition and orchestration settings, making software development, refactoring and testing much easier than the traditional process. While some embodiments are well suited for implementation in PaaS/FaaS architectures, alternative embodiments can be implemented in any suitable computing environment that would benefit from one or more dynamic application management functionalities.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not necessarily restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments.

Furthermore, some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or a computing system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid cloud computing environment). A computing environment that comprises multiple cloud platforms (private clouds, public clouds, or a combination thereof) is referred to as a "multi-cloud computing environment."

Moreover, phrases "computing environment," "cloud environment," "cloud computing platform," "cloud infrastructure," "data repository," "data center," "data processing system," "computing system," "data storage system," "information processing system," and the like as used herein are intended to be broadly construed, so as to encompass, for example, any arrangement of one or more processing devices.

Illustrative embodiments, as will be further explained, provide dynamic application management comprising decomposition, transformation and orchestration of an application across a multi-cloud computing environment.

Decomposing an application into jobs or functions (software components) that execute in a computing environment is very time consuming and takes a lot of manual work. Such computing environments may include cloud computing services including Platform-as-a-Service (PaaS) or Function-as-a-Service (FaaS). PaaS is a computing service implemented in a cloud computing environment in which a third-party provider (PaaS provider) provides hardware and software tools (hosted on the PaaS provider infrastructure) to enable a user to develop and manage an application. Thus, the user develops and manages the application and the service platform is managed by the PaaS provider. In contrast, FaaS is a computing service implemented in a cloud computing environment in which a third-party provider (FaaS provider) provides hardware and software tools (hosted on the FaaS provider infrastructure) to enable a user to develop and manage application functions without the complexities of developing and deploying a monolithic application. Thus, the user develops and manages the application functions and the service platform is managed by the FaaS provider. Many times, such computing services also comprise Container-as-a-Service (CaaS) which is a service that enables users to manage containers deployed to execute application functions. As illustratively used herein, a "container" is a processing component that includes logical processing functionalities that enable an application (or a subset of one or more functions) to execute in a self-contained manner. In comparison to another logical processing component known as a "virtual machine" which is managed by a hypervisor and utilizes virtual machine hardware, a container system provides operating system services from the underlying host and isolates the application using virtual-memory hardware. While embodiments are described herein from the perspective of a container system, it is to be appreciated that alternative embodiments can employ other logical processing components such as but not limited to virtual machines. Containers and/or virtual machines may also be referred to herein as examples of "virtual computing elements."

Thus, for example, decomposing an application involves refactoring on both application code and the test suite, as well as creating separate container images and deployment manifests if the functions service does not support raw code compilation. After the application is refactored into jobs or functions, it is still quite difficult to maintain, as there could be tens of jobs and hundreds of functions for a typical application, making long-term maintenance difficult and cost heavy.

Furthermore, with container-orchestration serverless architectures becoming more popular, owners of monolithic style applications or microservices are seeking transformation into the serverless or container world. "Serverless" refers to a cloud computing model (PaaS/FaaS/CaaS) where the customer does not pay for underutilized resources, rather functions are taken as input and resources are typically only used to run them at execution time. As mentioned, this type of transition involves manual refactoring of existing monolithic applications or microservices which requires large amounts of human resources and time.

A solution has been proposed to enable a developer to mark one or more software components (one or more functions) of an application that they want to execute on a separate container without fully refactoring the monolithic application or microservice. For example, the solution enables a marked software component of an application running in a main container to be executed in a separate container via a container spawning process that utilizes a function calling chain. A "container spawn" refers to, for example, a containerized piece of code which runs separate from the main container or application. However, such a solution does not propose a mechanism for performing this function calling chain in a multi-cloud computing environment. There are a significant number of problems related to even single cloud usage, such as compliance, cost and security. Since every cloud's interface and operation (e.g., specialties, pricing, compliance and security capabilities, etc.) is different, decomposing applications into a multi-cloud computing environment requires a new type of models and functionalities. Additionally, the problem of how to load balance requests for different clouds and decide when to spawn a function out to a separate container on a cloud has to be addressed. Because of these and other issues, it would make it much more complicated and arduous for developers to mark functions properly so that each function would be run via its optimal cloud provider. These and other limitations associated with the above-mentioned container spawning process will now be further described.

Decomposing an application and orchestrating software components across multiple cloud providers. An application may have multiple software components. Each of these components may have specific characteristics that would more ideally be executed in different cloud environments, depending on the specialties (functionalities) of the cloud offerings. Currently, engineering teams would need to spend a large amount of manual engineering effort to decompose an application into individual executable components and orchestrate them across multiple cloud providers by manual deployment or creating custom deployment scripts.

Although the industry has been somewhat united by the open-container-initiative, cloud service providers still have different standards and application programming interfaces (APIs) around configuration, function APIs, event triggers, etc. Microservices and functions developed for one cloud platform (e.g., Amazon Web Services (AWS) Lambda) do not have a clear path of migration across clouds and datacenters without a significant manual engineering effort.

Difficult to orchestrate each software component on the optimum cloud provider. Each monolithic application or microservice is currently expected to be hosted on one single cloud platform and duplicated across cloud platforms. However, it is realized that it takes a significant amount of manual engineering effort to break apart an application to be executable across multiple cloud platforms, so that each software component of the application can utilize the special infrastructure and capabilities offered by specific cloud providers (e.g., a realization that a given application resides on a private cloud platform, but part of the application needs to utilize a tensor processing unit (TPU) from Google Cloud Platform (GCP)).

Different cloud providers have differences in compliance or security. Most of today's companies have terabytes of data and they acquire more data as they grow. Because of the type of the data, many companies rely on a private cloud platform to keep that data secure. Government regulations also play a role in how this data is managed. Companies must follow government regulations relating to where this data can be stored, for example, the General Data Protection Regulation (GDPR) which is a regulation in the European Union (EU) specifying data protection and data privacy requirements in the EU.

Furthermore, to access this data, companies typically keep their software on this same private cloud platform. Keeping the data and software in their own private cloud can start to become expensive, with server management costs racking up. To reduce cost, it may be appropriate for a company to host its software on a public cloud platform while accessing its' data on the private cloud. However, dividing the software and data into two different systems can bring its own cost. This would have to be done manually and can include a significant amount of duplicate work in order to be able to enable different portions of code to communicate with one another. Such work can include hours of manual labor and can be error prone. There is also always the possibility of changed government regulations and/or new government restrictions, which may mean placing old code on a new cloud platform that meets the changed/new regulations.

Difficult to trial-and-compare on application decomposition to optimize execution and cost. As cloud service providers typically charge based on consumption, it is difficult to determine which cloud service provider would provide measurable cost and/or execution advantage for individual software components. Furthermore, the computation and memory consumption depend on how the software components are split from the original application.

Following traditional software engineering methodologies, developers would need to manually refactor the application to separate out each software component, going through the entire lifecycle of development, testing, packaging, and deployment. Then, operators would need to have multiple testing rounds by deploying each software component on each cloud service provider to measure the hosting cost.

Each testing round will likely take weeks, and the cost of software engineering and deployment would likely outweigh the hosting cost reduction. As a result, most applications are hosted sub-optimally, costing unnecessary hosting charges.

Data gravity problems with multi-cloud workload orchestration. Applications, microservices, and functions are typically hosted alongside their data and data services. As enterprises are increasing their investments on hybrid and multi-cloud strategies, this data gravity problem becomes more complex, as data may now reside in multiple locations. Transmitting a large amount of data back and forth across cloud platforms is not efficient in terms of network cost and execution time.

Currently, when an application needs to access data from multiple location, the architecture needs to be specially design. Some architectures leverage virtual private networks (VPNs) and remote data connections (which usually impact performance), some duplicate data across multiple locations (leading to unnecessary storage and network cost, while running into data consistency issues), while others split up the application to have software components executed alongside the data.

Orchestrating software components across private and public clouds. Currently, there are efforts from large cloud vendors trying to provide multi-cloud services; however, the effort usually leads the users to stick with a single vendor. For instance, Kubernetes provides Kube federation which allow users to connect clusters of Kubernetes in public and private clouds. Additionally, Amazon Web Services has public cloud serving and Amazon Outpost has private cloud serving. While efforts of bridging public and private clouds are being made, there is no solution on connecting across public and private clouds (i.e., cross platforms). Usually, the user would need to develop their application once and deploy them on multiple cloud platforms in public and private.

Illustrative embodiments overcome the above and other challenges by enabling developers to decompose an application to identify software components with code-markers, and have these components running on different clouds dynamically based on user-defined policies. By defining and modifying these user-defined policies, the scheduling of the software components can be adjusted dynamically without re-deployment of the application. Furthermore, as placing and adjusting code-markers in code is relatively quick, developers can quickly test out different decomposition and orchestration settings, making software development, refactoring and testing much easier than the traditional process. Thus, a "code-marker" refers to, for example, a piece of code inserted in or near a function and meant to mark the function as being designated to execute on different clouds dynamically based on user-defined policies.

Figure 1:
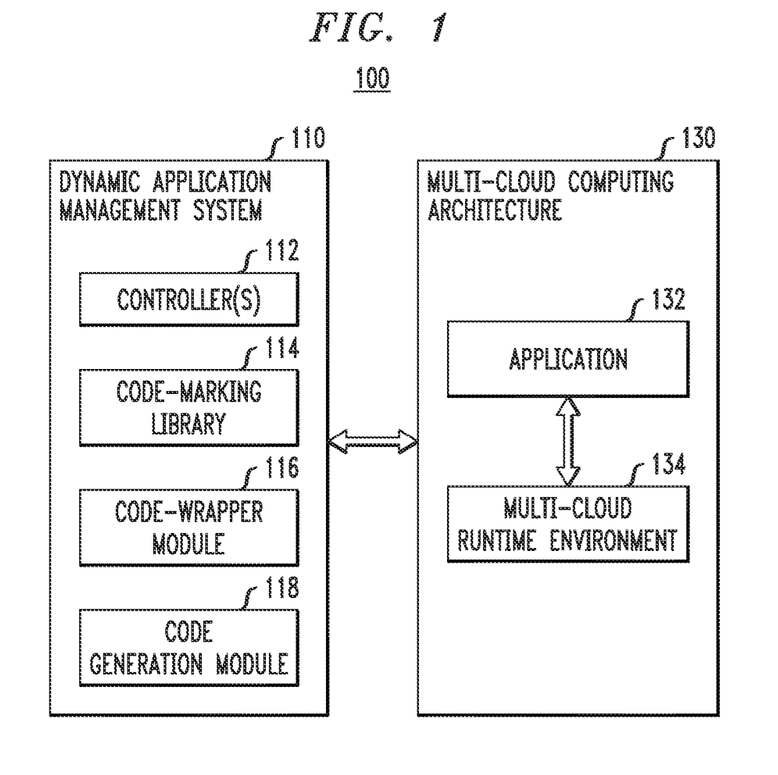
FIG. 1 depicts a computing environment with dynamic application management with which one or more illustrative embodiments can be implemented.

Referring now to FIG. 1, a multi-cloud computing environment with dynamic application management is depicted. More particularly, computing environment 100 comprises dynamic application management system 110 operatively coupled to a multi-cloud computing architecture 130. As shown, dynamic application management system 110 comprises the following modules: a controller(s) 112, a code marking library module 114, a code wrapper module 116 and a code generation module 118, which will each be described in further detail below. As will be evident from further description below, there can be a plurality of controllers (e.g., a controller cluster) in accordance with illustrative embodiments. Note that multi-cloud computing architecture 130 represents a portion of a multi-cloud computing environment (e.g., comprising multiple cloud platforms, one or more of which may be configured with PaaS/FaaS/CaaS services). As shown, multi-cloud computing architecture 130 comprises an application 132 and a multi-cloud runtime environment 134. Note that while modules or other components in dynamic application management system 110 are depicted separately from multi-cloud computing architecture 130, it is to be understood that, in illustrative embodiments, one or more such modules or components, and/or other components associated with or otherwise generated by these modules or components (e.g., interceptors, routers, code-wrappers, code-generators, function registry, etc.), are or can be implemented within multi-cloud computing architecture 130, as will be further explained below.

While other modules or components to be described herein below may play a role in dynamic application management, three modules: controller 112, code-marking library module 114 and code-wrapper module 116, play main roles as will be further explained. Furthermore, depending on the programming language that the application is written in, code generation module 118 may be utilized as will be explained. The following description will explain how dynamic application management according to illustrative embodiments works at different time-periods: (i) development; (ii) pre-compilation—code generation; (iii) post-compilation; and (iv) runtime.

(i) Development Time-Period

In one or more illustrative embodiments, code-marking library module 114 is embedded in application 132 and serves two main purposes: (i) identifying the decomposed software components of application 132 at development time; and (ii) communicating with controller 112 at runtime and route function invocation according to decisions made by controller 112.

Code-marking library module 114 provides developers the ability to annotate their code to mark which software component can be decomposed. Depending on the programming language of the application 132, there are multiple mechanism that can be used for implementation of code-markers. By way of example only, a comment can be used for the Go programming language or Golang (//go:generate directive), a macro for C/C++, an annotation for Java, a function-wrapper for Nodejs, etc. A developer places these code-markers at strategic locations in the application 132, as execution from the method and further invocation chain can be executed in isolation.

(ii) Pre-Compilation—Code Generation Time-Period

Generating interceptor and code-wrapper for each cloud platform. If the programming language requires the use of a code-generator (e.g., Go programming language), an additional step is performed prior to compiling application 132, i.e., code generation via module 118. For other programming languages that do not require the use of a code generator, code generation can be skipped.

Figure 2:
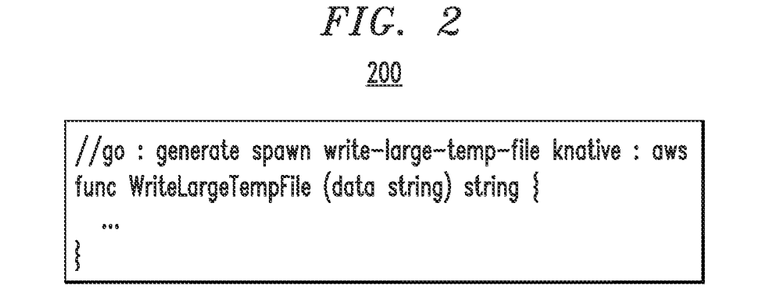
FIG. 2 depicts an example of a code-marker for dynamic application management in a multi-cloud computing environment according to an illustrative embodiment.

The code-marker in the application code annotates the method (i.e., function) that needs to be decomposed, for example, see the Go application code 200 in FIG. 2. As shown in FIG. 2, the code generator ("spawn" in this example) is an executable binary that is invoked for each annotated method. The code generator, by parsing the abstract syntax tree of the application, evaluates the method. The code generator also uses the label from the comment ("write-large-temp-file" in this example) as an input. Based on the signature of the annotated method, the code generator generates a method with the exact signature as the original method. This method, however, embeds an interceptor (described in the Runtime section below). The code generator is template-based. The templates are identified by the second argument in the comment ("knative:aws" in this example). This argument identifies the platforms that this method can potentially execute on (i.e., Knative or AWS). Based on the template (one for each distinct platform API), a code-wrapper is also generated. This code-wrapper is responsible for being invoked by the cloud platforms and bridging the gap between the platform and the method by transforming the input and output of the method (described in the Runtime section below). Also based on the template, the code generator can generate a deployment configuration (i.e., a yaml manifest), so that controller (to be described further in FIG. 3) knows how to orchestrate these workloads at runtime. In sum, the interceptor and code-wrapper are generated after this step and they are ready for compilation.

Generating an interceptor router. Likewise, an interceptor router is generated for the controller to schedule the workload for different clouds. The router takes one or more parameters that are passed to the function and transferred along to the appropriate interceptors. This router receives commands from the controller to know where to route the function. These operations are illustrated and further described below in the context of FIG. 3.

Figure 3:
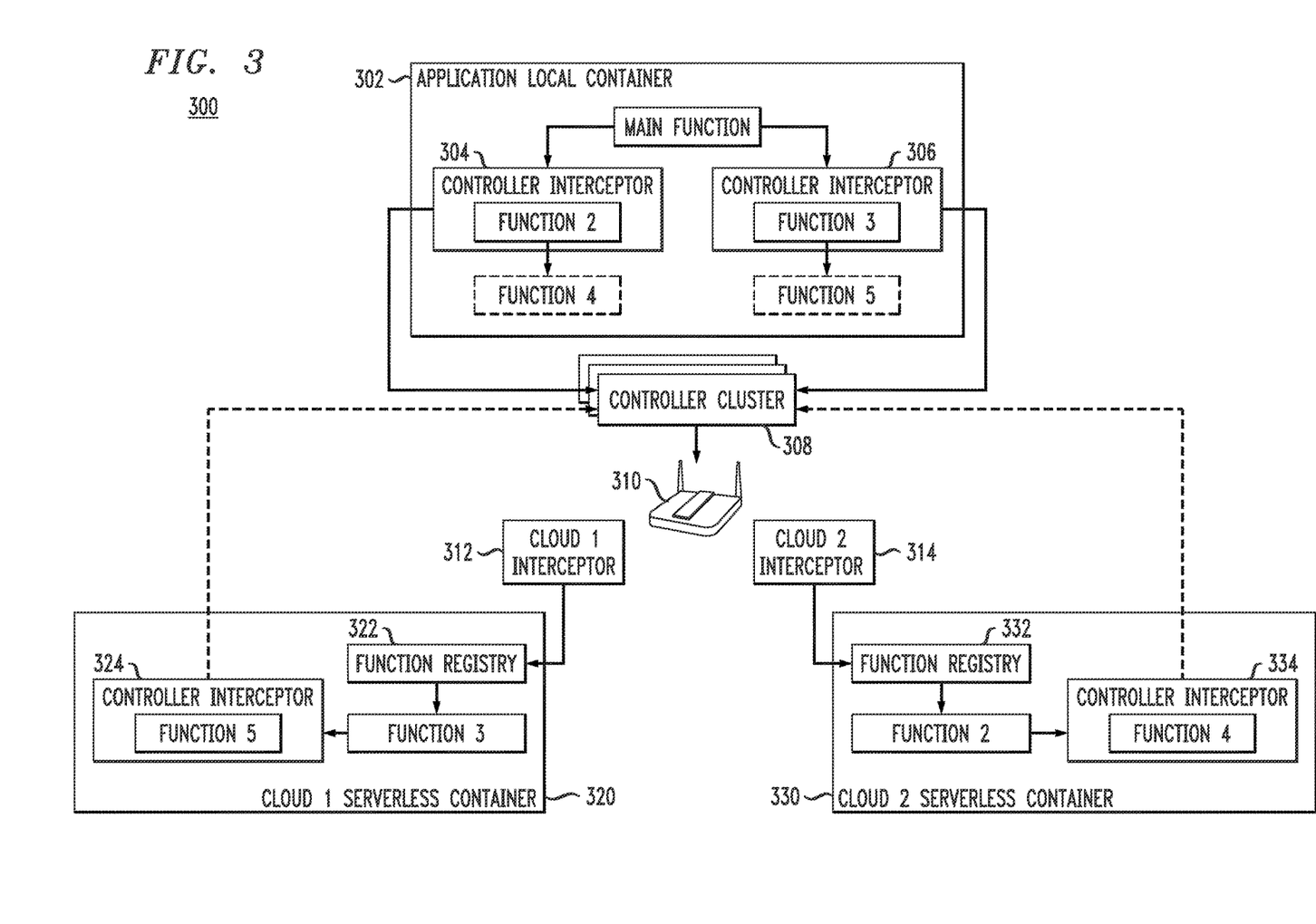
FIG. 3 illustrates dynamic application management controllers and interceptors according to an illustrative embodiment.

FIG. 3 illustrates an example 300 of dynamic application management controllers and interceptors according to an illustrative embodiment. More particularly, FIG. 3 shows a call flow for how a request to an application is handled with the use of dynamic application management system 110. Assume the request comes into the local container 302, and the main function which was requested is invoked. Any functions which were referenced are also invoked, assume here Functions 2, 3, 4 and 5. In the call flow, as shown, main function calls Function 2 and Function 3, and Function 2 calls Function 4, while Function 3 calls Function 5. Assume further that Function 2 and Function 3 in local container 302 are previously marked by the application developer with code-markers identifying cloud platforms that each function can potentially execute on. As further shown, the invocation of Function 2 is intercepted by interceptor 304, while the invocation of Function 3 is intercepted by interceptor 306. Each interceptor (304 and 306) communicates with controller cluster 308 to coordinate which cloud platforms the respective code-marked function will execute on. Controller cluster 308 represents multiple controllers, for example, one controller for each interceptor. Note that, as explained above, a code-marking library module can be used to identify the code-marked functions.

As further shown, controller cluster 308 communicates through network device 310 with respective cloud interceptors, Cloud 1 interceptor 312 and Cloud 2 interceptor 314. Cloud 1 interceptor 312 is operatively coupled to Cloud 1 serverless container 320, while Cloud 2 interceptor 314 is operatively coupled to Cloud 2 serverless container 330. In Cloud 1 serverless container 320, function registry 322 identifies the function to be invoked as specified through the controller cluster 308, and invokes the function, e.g., in this example, Function 3. Similarly, in Cloud 2 serverless container 330, function registry 332 identifies the function to be invoked as specified through the controller cluster 308, and invokes the function, e.g., in this example, Function 2. Note further that Function 5 in Cloud 1 serverless container 320 depends from Function 3 (as is the case in local container 302). Function 5 in container 320 can be code-marked to cause interceptor 324 to communicate back to the local container 302 through controller cluster 308. Similarly, Function 4 in Cloud 2 serverless container 330 depends from Function 2 (as is the case in local container 302) and can be code-marked to cause interceptor 334 to communicate back to local container 302 through controller cluster 308. For example, in this manner, responses from the cloud-executed, spawned functions (Functions 2, 3, 4 and 5) are sent back through the local container 302 so that the responses are received by the original caller (requestor). Details of how code-generators and code-wrappers enable the above-mentioned functions in FIG. 3 to be spawned in cloud-based containers will be further explained below.

(iii) Post-Compilation

It is to be appreciated that the code generator (spawn in this example) is configured to create a different set of deliverables or executables for different serverless cloud platforms. For instance, if the developer specifies the code-generator to generate a code-wrapper for Knative and AWS, it will initiate a set of Knative service deployment yaml files and a zip file for AWS Lambda function. Those deliverables are ready to be uploaded to both platforms. However, before uploading the software components, spawn requests the platforms' credentials in order to upload the code-wrapper. To login to a platform, the system can run 'spawn-admin login knative' or 'spawn-admin login aws', then it will prompt the system accordingly. After setting up the credentials, the command to upload the deliverable is executed. For example, for spawn in Golang, the command is: spawn-admin upload knative:aws. Note that systems will not be charged by having uploaded software component stored. Most serverless cloud platforms charge customers on the number of requests the endpoint receives, so if there are no or few requests coming in, the system will typically not be billed.

(iv) Runtime

Figure 4:
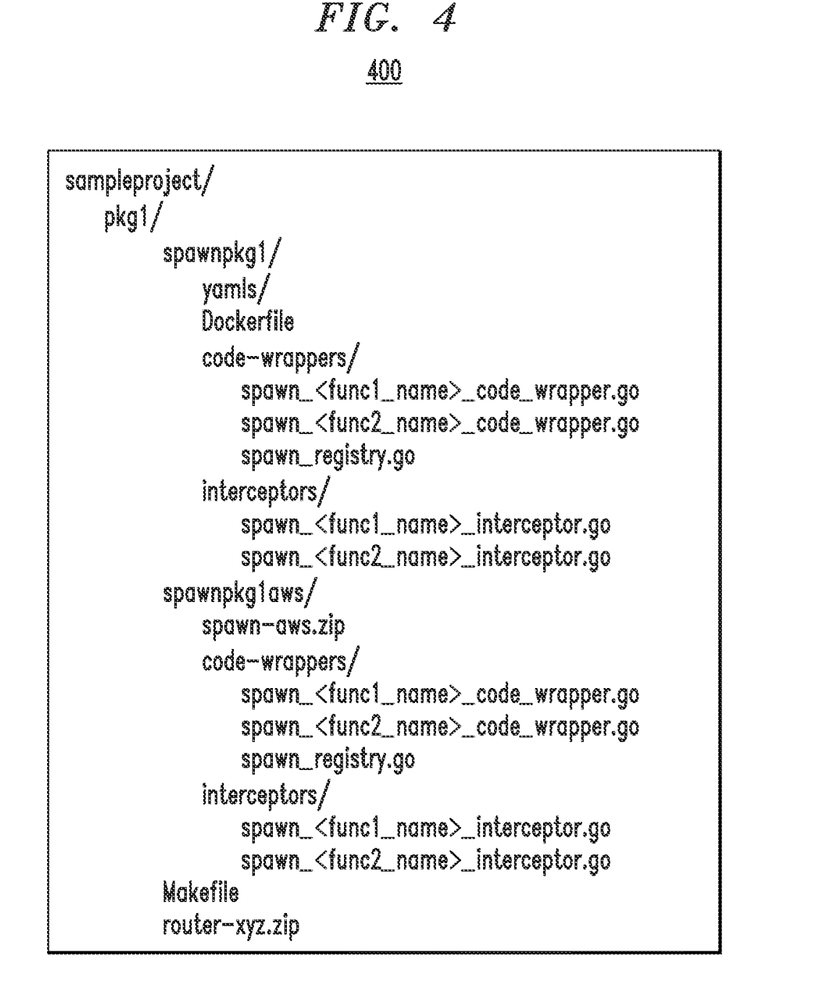
FIG. 4 depicts an example of code for use with dynamic application management in a multi-cloud computing environment according to an illustrative embodiment.

FIG. 4 illustrates example code 400 of a runtime workflow of the code generator spawn (see FIG. 2). The term "system" as used in this example may refer to one or more modules of the dynamic application management system described herein.

1. Code-marking function to decompose into software components. At the beginning, the function to be broken down into separate software components is code-marked. For example, as depicted in FIG. 2 in Golang (Go programming language), the following code-marking can be inserted on top of the function:

//go-generate write-large-temp-file knative:aws
func WriteLargeTempFile(content string) string {
. . .
}

This means that the code generator will create a controller interceptor and a code-wrapper for this function.

2. Generate the interceptors and controller router for cloud platforms. After the user marks each software component to be separated, "go generate ./pkgname" is called. Then, the system generates the interceptor packages as spawnpkgname (for Knative) and spawnpkgnameaws (for AWS). These interceptors include the interceptor code for each platform. In addition, a Makefile on how to build the code-wrapper for the package is also generated. Furthermore, a controller router zip file named router-<random-uid>.zip is generated to be uploaded to the controller later.

3. Generate the code-wrapper for cloud platforms. After generating the interceptors, the system generates the code-wrapper to upload them to the platform. To do this, the system runs 'make all' and the command reads the generated Makefile to build the code-wrapper for each platform. As an example, for Knative, the system creates a zip file containing the container image; and for AWS, it creates a zip file for AWS Lambda.

4. Upload it to the clouds. To upload the deliverables to the clouds, the system uses another command that is delivers with the spawn bundle. The clouds run 'spawn-admin upload aws:knative' (assuming that they already entered their AWS credentials, Knative credentials, and Docker registry credentials to a previous prompt from the code-generator). After that, the code-wrapper zip files are uploaded to the clouds. Notes that the application developer will not be charged for having its files stored idly in the cloud but rather only if there are many requests coming in.

Figure 5:
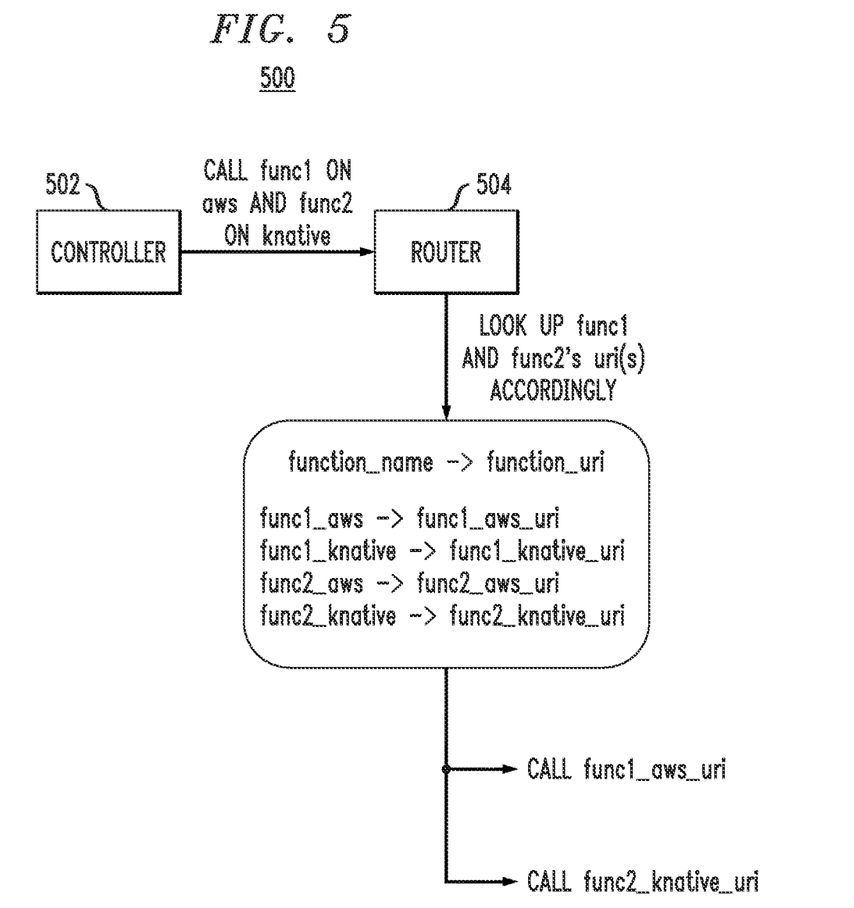
FIG. 5 illustrates a dynamic application management controller and router according to an illustrative embodiment.

5. Register the router to the controller. As described in step 2, a router-<random-uid>.zip file is generated. This file contains the mapping for the function name, cloud name, and function parameters. The system uploads this file to the controller using the command 'spawn-admin upload router router-<random-uid>.zip' to upload the router logic. FIG. 5 illustrates an example 500 of how a router 504 looks up a function uniform resource identifier (URI) on different cloud platforms in response to function calls from controller 502.

Furthermore, dynamic application management also provides dynamic orchestration. For example, in accordance with one or more illustrative embodiments, developers are able to define characteristics and needs of software components with code-markers (for example, "fast-execution," "need-gpu," "top-secret," etc.). The information technology (IT) operators are responsible for defining policies to handle those developer demands (for example, "top-secret software components should be executed in underground datacenter A").

Based on the characteristics described with respect to the code-markers by the developers and the policies defined by the operators, dynamic orchestration can be performed by the controller (e.g., one of the controllers of controller cluster 308 in FIG. 3) to select a specific cloud that best fits the needs of a specific software component. If the demands and policies cannot evaluate to an environment, the controller is configured to fall back to a catch-all policy. For example, if no environment can satisfy both demands of "storage-optimized" and "gpu-enabled," then a catch-all policy (e.g., default policy) applies and selects an environment based on the priority specified in the code-markers.

The dimensions and functionalities of the policy definitions are based on the use-case. At a minimum, in some embodiments, the controller is configured with a policy-engine that maps abstractions from code-markers to the execution environments of one or more clouds, enabling dynamic orchestration across the multiple clouds.

With the abilities described above, the software component can execute on different clouds. For each executing software component, it is possible to retrieve or calculate the information about it, such as how much time it took or how much money it cost, etc. If the software component crashed or was not able to start at all, failure logs are retrieved and sent to the controller.

Furthermore, based on previous runtime telemetry (for example, execution time and cost), when a software component can be orchestrated to multiple environments based on the code-marker and policies, the orchestrator (controller) can also make a more optimized decision on where to orchestrate the software component. This functionality can be performed with a pre-defined priority list based on the average of these runtime statistics.

Advantageously, as described herein, illustrative embodiments provide code generation and function transformation to enable mobility across multiple cloud platforms. More particularly, illustrative embodiments generate code-wrappers, interceptors and mapping arguments to transform local functions into serverless cloud platform deliverables (e.g., container images, yaml files, and zip files). Furthermore, illustrative embodiments provide commands to upload these deliverables to the platforms. Prior to this dynamic application management for multi-cloud computing environments, the developers would read the API of each platform and manually translate their applications' functions accordingly in order to upload the software components to the cloud. Also, they would need to make sure that their arguments and parameters were correctly translated and mapped. Because such a conventional translation process takes a lot of manual effort, once an application is successfully transformed to execute on a cloud platform, it is unlikely that the developer would go through the process again for another cloud platform. Since illustrative embodiments enable developers to go through the process automatically on multiple cloud platforms, users now have the choice of moving their applications to different cloud platforms. This capability can also be applied for functions to gain mobility. For example, if a function is written against the cloudevent.io standard, according to illustrative embodiments, a function wrapper can be generated, so that the function can be executed on AWS Lambda.

Further, as described herein, illustrative embodiments provide for decomposing an application and orchestrating individual components on targeted infrastructure in an optimal cloud. More particularly, a spawn instruction is used to decompose an application into software components to run on multiple cloud providers. At the same time, spawn provides a controller cluster to orchestrate calling chains of these components. When a component is called, it sends the function parameters to the controller. Then, the controller decides which cloud to spawn the function on and then sends the function parameters accordingly. In addition, the controller chooses the most optimal cloud to run the software component.

Still further, as described herein, illustrative embodiments provide for user-defined policies of multi-cloud software component execution around compliance. More particularly, illustrative embodiments introduce the concept of a policy-based function execution system. The controller takes in policy information in order to schedule which cloud to run the function. There are many criteria to consider for a policy such as, but not limited to, compliance, cost, utilization, processing time, etc. For instance, when considering compliance as one of the policy constraints, users would specify which software component should be run in a private datacenter for the data to stay local relative to the software component. As the controller could schedule workload based on compliance automatically, it will prevent leaking data incidences that do not comply with the company or government's rules.

Additionally, as described herein, illustrative embodiments provide for policy-based multi-cloud optimization. More particularly, illustrative embodiments enable a user to AB test their software components and bring the cost down for doing so. As mentioned above, users would want to test which cloud is best for them to host their software components to optimize run time and bring down cost. However, decomposing an application into software components and testing them on multiple clouds manually is very difficult and costly. For each time the users refactor their code into components to run on a different cloud, the users would go through the entire development cycle again such as reading cloud APIs, writing tests, coding cloud adaptors, etc. on the cloud that they are refactoring and testing. This means that many requests would be made during their testing process, thus inducing significant development cost. In accordance with illustrative embodiments, the user would not need to worry about their cost of developing on a cloud. Rather, they can compare the cost of running their software among clouds and come up with the best options for their software in terms of cost.

Illustrative embodiments also provide for orchestrating software components to the cloud platform that is optimal for data gravity. More particularly, illustrative embodiments enable the user to move their software components to where their data resides. There are many problems with moving data across clouds such as duplication of data, data inconsistency, data loss, or data unavailability. There is significant cost associated with trying to resolve those issues with conventional methods. Instead, illustrative embodiments enable breaking the necessary components to reside the data and process them. At the same time, it could split those less data focused components, which aggregate the results of the other heavy processing data components, into other clouds which would save cost. For example, if there are five data sources in five different locations all around the world, the application can be broken down into six pieces, with the main piece hosted at the least cost-expensive location, while the other five components can be hosted where the data sources are located.

By way of further advantage, illustrative embodiments provide automation to write once and deploy everywhere. More particularly, illustrative embodiments enable a user to focus on developing its application while deploying the application to multiple cloud platforms on either public or private clouds. Currently, each cloud provider is attempting to enable both public and private clouds for their brand. For instance, AWS offers public AWS and private AWS Outposts. Kubernetes on GCP offers K8S federation. Dell EMC has vSphere and Virtustream. The barrier is not only between public and private clouds but also between each platform and brand name. Illustrative embodiments bridge all these gaps so that the user would only focus on developing their applications instead of focusing on brand name, locality, compliance and cost.

Use-Case: Multi-Cloud Strategy and Workload Placement

Assume a hyper-scale software provider offers a SaaS application. It is spending a significant amount of money on hosting costs for both data and workload with its current cloud service provider. The software provider decides that it might be a good idea to move the data to another cloud service. Looking at different cloud services, the provider notices that it would still pay a prohibitive amount. Further assume that while selecting a cloud service that works, the software provider notices that many cloud services give them resources such as storage that some parts of the code need but others do not need. They notice that if they divide the code into sections, they might use less money so they do research on it.

Figure 6:
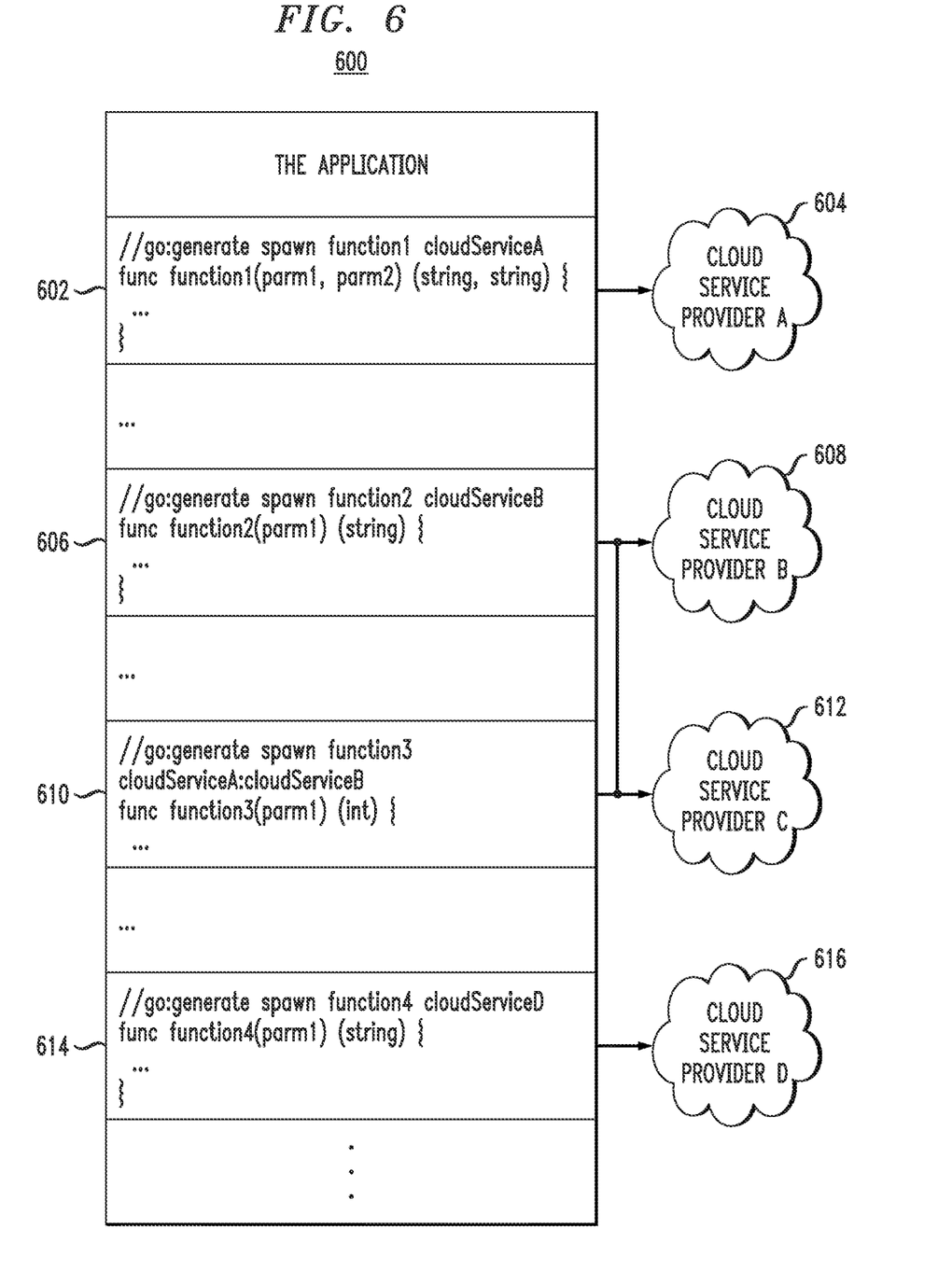
FIG. 6 illustrates an example of a decomposed application managed in a multi-cloud computing environment according to an illustrative embodiment.

After research, the software provider has decided to host their data and workload with the following multi-cloud strategy:

1. Relational database—Cloud Service Provider A
2. Non-relational database—Cloud Service Provider B
3. Object Storage—Cloud Service Provider C
4. Sensitive Data—Private Datacenter with Dell hardware
5. AI/ML workload and Data warehousing—Cloud Service Provider D
6. All other workloads—Cloud Service Provider E The software provider decides to divide their code, but quickly notices that this is not an easy task. The first hurdle encountered is dividing the code in a way that would still allow the code work correctly. This process would take a considerable number of man-hours to perform. Once this is done, the second hurdle encountered is that not all the software provider's software is compatible with the optimal cloud service. This code would have to be changed or an adapter would have to be generated to be able to run the code. Other costs would also have to be considered, e.g., management and regulations. Using the conventional process with all its hurdles, it is evident that it can be difficult to move code to a multi-cloud computing environment and its can be expensive. However, in accordance with illustrative embodiments, developers can distinguish code segments and the system automatically runs them in different cloud systems. As illustrated in example 600 of FIG. 6, the software provider can distinguish parts to be run in different cloud services, i.e., code 602 runs on the cloud platform of cloud service provider 604, code 606 runs on the cloud platform of cloud service provider 608, code 610 runs on the cloud platform of cloud service provider 612, and code 614 runs on the cloud platform of cloud service provider 616. Advantageously, using the dynamic application management techniques described herein whereby code-markers display which code to run where, the application can be divided in minutes, and run on different clouds.

Figure 7:
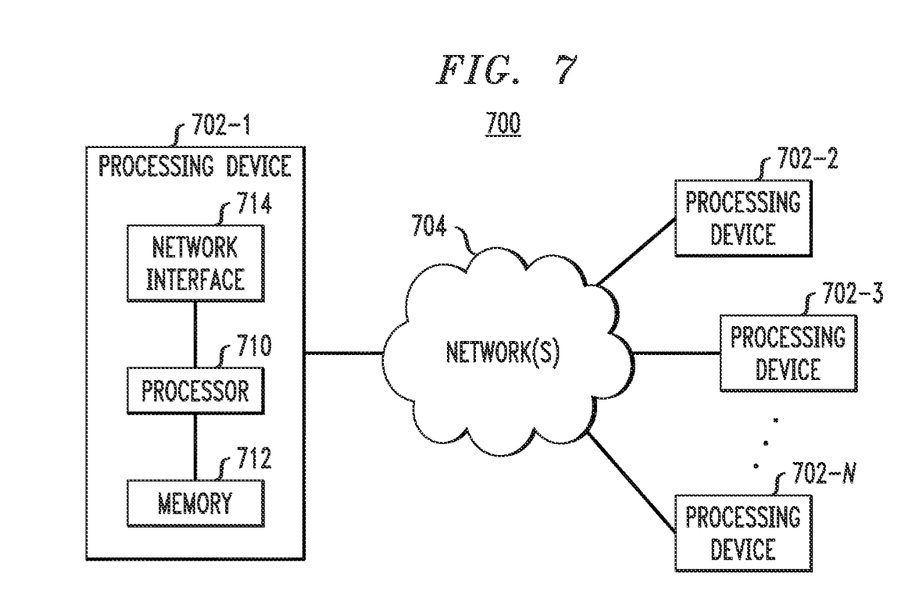
FIG. 7 depicts a processing platform used to implement dynamic application management in a multi-cloud computing environment according to an illustrative embodiment.

FIG. 7 depicts a processing platform 700 used to implement dynamic application management in a multi-cloud computing environment, according to an illustrative embodiment. More particularly, processing platform 700 is a processing platform on which a computing environment with functionalities described herein (e.g., FIGS. 1-6 and otherwise described herein) can be implemented.

The processing platform 700 in this embodiment comprises a plurality of processing devices, denoted 702-1, 702-2, 702-3, . . . 702-N, which communicate with one another over network(s) 704. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 702 shown in FIG. 7. The network(s) 704 represent one or more communications networks that enable components to communicate and to transfer data therebetween, as well as to perform other functionalities described herein.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the networks 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers. As illustratively used herein, a container is considered a "virtual computing element" (e.g., unit of software) that packages application code and its dependencies so that the application is executed quickly and reliably from one computing environment to another. A Docker container image is a lightweight, standalone, executable package of software that includes all components needed to execute an application.

The particular processing operations and other system functionality described in conjunction with FIGS. 1-7 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform comprising one or more processing devices;
   said at least one processing platform being configured to:
   execute a portion of an application program in a first virtual computing element, wherein the application program comprises at least one portion of marked code;
   receive a request for execution of the portion of marked code;
   determine, based at least in part on the portion of marked code, one or more cloud platforms on which to execute the portion of marked code; and
   cause the portion of marked code identified in the request to be executed on the one or more cloud platforms;
   wherein causing the portion of marked code identified in the request to be executed on the one or more cloud platforms comprises, for a given one of the one or more cloud platforms:
   instantiating a second virtual computing element remote from the virtual computing element at the given cloud platform;
   generating a code wrapper for the given cloud platform, the code wrapper being configured for transforming input and output of the portion of marked code between the first virtual computing element and the second virtual computing element; and
   providing the generated code wrapper to the given cloud platform.

2. The apparatus of claim 1, wherein the processing platform is further configured to determine the one or more cloud platforms on which to execute the portion of marked code based on at least one policy.

3. The apparatus of claim 2, wherein the at least one policy comprises determination criteria including one or more of compliance, cost, utilization, data gravity, and processing time.

4. The apparatus of claim 1, wherein the processing platform is further configured to determine an optimal cloud platform among the one or more cloud platforms on which to execute the portion of marked code.

5. The apparatus of claim 1, wherein the one or more cloud platforms comprise at least one of one or more of private cloud platforms and one or more public cloud platforms.

6. The apparatus of claim 1, wherein the processing platform is further configured to cause the portion of marked code identified in the request to be executed by managing orchestration of the execution of the portion of the marked code within a determined one of the one or more cloud platforms.

7. The apparatus of claim 1, wherein the processing platform is further configured to obtain credentials for a determined one of the one or more cloud platforms.

8. The apparatus of claim 1, wherein the portion of marked code is marked by the code-wrapper.

9. The apparatus of claim 1, wherein the portion of marked code comprises at least one application function.

10. The apparatus of claim 1, wherein the first virtual computing element is a first container and the second virtual computing element comprises a second container remote from the first container.

11. The apparatus of claim 1, wherein the processing platform comprises one or more of a controller, a code-marking library module, and a code-wrapper module.

12. The apparatus of claim 11, wherein the processing platform further comprises a code generation module.

13. A method comprising:
    executing a portion of an application program in a first virtual computing element, wherein the application program comprises at least one portion of marked code;
    receiving a request for execution of the portion of marked code;
    determining, based at least in part on the portion of marked code, one or more cloud platforms on which to execute the portion of marked code; and
    causing the portion of marked code identified in the request to be executed on the one or more cloud platforms;
    wherein causing the portion of marked code identified in the request to be executed on the one or more cloud platforms comprises, for a given one of the one or more cloud platforms:
    instantiating a second virtual computing element remote from the virtual computing element at the given cloud platform;
    generating a code wrapper for the given cloud platform, the code wrapper being configured for transforming input and output of the portion of marked code between the first virtual computing element and the second virtual computing element; and
    providing the generated code wrapper to the given cloud platform;
    wherein the steps are performed by at least one processing platform comprising one or more processing devices.

14. The method of claim 13, wherein the step of determining the one or more cloud platforms on which to execute the portion of marked code is based on at least one policy.

15. The method of claim 14, wherein the at least one policy comprises determination criteria including one or more of compliance, cost, utilization, data gravity, and processing time.

16. The method of claim 13, further comprising determining an optimal cloud platform among the one or more cloud platforms on which to execute the portion of marked code.

17. The method of claim 13, wherein the one or more cloud platforms comprise at least one of one or more of private cloud platforms and one or more public cloud platforms.

18. The method of claim 13, wherein the first virtual computing element is a first container and the second virtual computing element is a second container remote from the first container.

19. An article of manufacture comprising a non-transitory processor-readable storage medium having stored therein program code of one or more software programs, wherein the program code when executed by at least one processing device causes said at least one processing device to perform steps of:
- executing a portion of an application program in a first virtual computing element, wherein the application program comprises at least one portion of marked code;
- receiving a request for execution of the portion of marked code;
- determining, based at least in part on the portion of marked code, one or more cloud platforms on which to execute the portion of marked code; and
- causing the portion of marked code identified in the request to be executed on the one or more cloud platforms;
- wherein causing the portion of marked code identified in the request to be executed on the one or more cloud platforms comprises, for a given one of the one or more cloud platforms:
  - instantiating a second virtual computing element remote from the virtual computing element at the given cloud platform;
  - generating a code wrapper for the given cloud platform, the code wrapper being configured for transforming input and output of the portion of marked code between the first virtual computing element and the second virtual computing element; and
  - providing the generated code wrapper to the given cloud platform.

20. The article of claim 19, wherein the step of determining the one or more cloud platforms on which to execute the portion of marked code is based on at least one policy, wherein the at least one policy comprises determination criteria including one or more of compliance, cost, utilization, data gravity, and processing time.

* * * * *